July 16, 1957  E. J. ROBERTS  2,799,638
PURIFICATION OF SOLUTIONS BY IONIC TRANSFER
Filed Aug. 17, 1954  3 Sheets-Sheet 1

INVENTOR.
Elliott J. Roberts
BY Robert A. Finch
ATTORNEY

INVENTOR.
Elliott J. Roberts

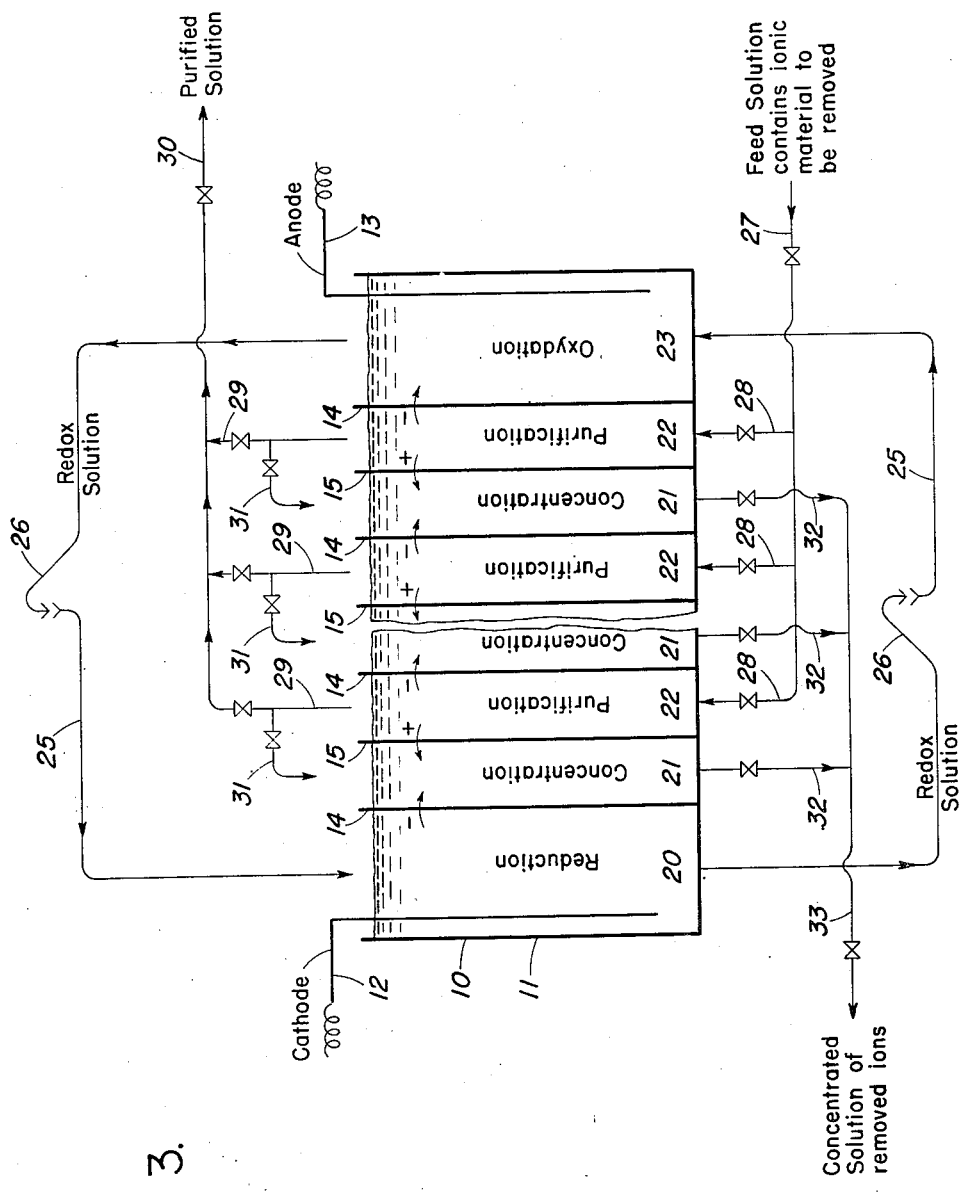

United States Patent Office 2,799,638
Patented July 16, 1957

2,799,638
PURIFICATION OF SOLUTIONS BY IONIC TRANSFER

Elliott J. Roberts, Westport, Conn., assignor to Dorr-Oliver Incorporated, a corporation of Delaware Application August 17, 1954, Serial No. 450,306

5 Claims. (Cl. 204—151)

This invention relates generally to the purification by demineralization of electrolyte-bearing solutions. More particularly it relates to improved ways and means for such demineralization by means of permselective membranes and electrolytic ionic transfer.

As used in this specification:

"Permselective membrane" refers to resinous membranes which, in a direct-current supplied electrolytic cell, permit the free passage of ions of one charge while resisting passage of ions of opposite charge. Thus, a cation-membrane permits only the passage of cations, while an anion membrane permits only the passage of anions.

"Redox" solution refers to a solution having one variable-valence ion (either cation or anion) which ion readily and reversibly passes from one valence to the other in a direct-current supplied electrolytic cell. A typical redox solution is a ferric chloride and ferrous chloride solution in which the ferric ion gains an electron at the cathode thereby reducing to ferrous chloride which will in turn reoxidize to ferric chloride at the anode where the ferrous ion gives up an electron to the anode.

"Active ions" refer to the variable-valence ions of the redox solution that are active with respect to the electrode with which they are associated. Thus, in a $FeCl_3$–$FeCl_2$ redox solution, the $Fe^{+++}$ is an active ion at the cathode where it will accept an electron while the $Fe^{++}$ is an active ion at the anode where it will give up an electron.

"Compatible" solution, as used herein, means that the ions of the solution will not form a precipitate with other ions present in the system under existing conditions. Thus, iron in solution is compatible with chloride because only solutions of ferrous or ferric chloride are formed. Chloride is compatible with iron, sodium, potassium, etc.

Briefly, a permselective membrane may be described as a three-dimensional network of an insoluble organic polymer. Bound into the chains of the network are insoluble reactive chemical groups which are free to dissociate and are capable of exchanging only cations or only anions in the same manner as granular exchange resins. The interstices between the chains are filled with water and are of such size that ions can pass through only by displacing ions already on the reactive groups lining the passages. Since this displacement can only occur by an ion exchange mechanism and, since the reactive groups of a given membrane will exchange only ions of a given sign, the membrane will readily pass ions of that sign while offering great resistance to the passage of ions of the opposite sign.

In other words, reactive groups of a cation permeable membrane ionize only in such a way as to leave a negative charge on the insoluble resin grouping while reactive groups of an anion permeable membrane ionize to leave only a positive charge on the insoluble resin grouping. Under these conditions a selective screening effect is set up so that cation permeable membranes repel anions while anion permeable membranes repel cations. Thus, under the influence of direct current, cations will migrate only through cation permeable membranes toward the cathode while anions will migrate only through anion permeable membranes toward the anode. The membranes are so formed as to be substantially water impermeable, that is, they permit ions to pass, but do not permit water to pass in significant quantities.

Permselective membranes possess many of the characteristics of granular exchange resins. However, since the chief mechanism is ion transfer through the membranes, it follows that the membranes are not subject to exhaustion or saturation and consequently do not require chemical regeneration as do granular exchange resins. This feature is of utmost importance because it means that the membranes are suited for continuous operation.

As described by Juda et al. in United States Patent 2,636,852, permselective membranes are particularly well adapted to the electrolytic demineralization of solutions. Such processes are most efficiently carried out in a cell made up of a plurality of adjoining chambers formed by alternating anion-permeable and cation-permeable membranes between a cathode chamber on one end and an anode chamber on the other end.

Such a system is frequently referred to as a concentration cell and, in its simplest form, comprises an insulated cell divided into three chambers including a cathode chamber, an intermediate chamber and an anode chamber. The separating wall between the cathode chamber and the intermediate chamber is a cation-permeable membrane while the other wall of the intermediate chamber, separating it from the anode chamber, is an anion-permeable membrane. The cathode chamber is equipped with a suitable cathode, such as stainless steel while the anode chamber is equipped with a suitable anode, such as platinum or graphite.

When all three chambers are filled with an electrolyte, such as sea water, and direct current is passed through the cell, the cations from the intermediate chamber pass through the cation-permeable membrane into the cathode chamber while anions pass from the intermediate chamber through the anion permeable membrane into the anode chamber. Since the cation permeable membrane prevents anions from leaving the cathode chamber and the anion permeable membrane prevents cations from leaving the anode chamber, the net result is a reduction of the mineral content of electrolyte in the intermediate chamber. The degree of ion removal in the intermediate chamber depends upon a number of factors including the quantity of electricity passed through the electrolyte, the efficiency of the membranes and the initial concentration of the electrolyte.

The amount of ion transfer in any chamber is measured by the amount of ionic discharge taking place at the electrodes, therefore the greater the number of intermediate chambers, the greater is the amount of ion transfer for a given amount of ionic discharge. Consequently, a commercial installation makes use of a large number of chambers between the electrodes of which one half are purifying chambers giving up ions to adjacent chambers while the remaining chambers receive ions from adjacent purifying chambers. The net result is the removal of ionic solids from half the chambers and concentration of solutions in the other half.

Such prior methods, although workable, are nevertheless commercially unattractive because they suffer from the disadvantage that both chlorine gas and free oxygen are liberated at the anode in varying quantities. This mixed gas liberation makes it virtually impossible to select a commercially practicable anode. Carbon, for instance, is unsuitable because of the fact that it deteriorates in the presence of free oxygen whereas lead is unsuitable because it deteriorates in the presence of chlorine gas, and platinum is commercially impracticable due to its prohibitive cost. Moreover, electrolytic gas evolution requires a certain minimum voltage which adds to operating costs.

It is therefore, a broad object of this invention to provide ways and means for conducting direct current through an electrolyte-solution filled cell while maintaining sufficiently low polarization at the electrodes so that gas evolution is eliminated.

A specific object of this invention is to provide improved ways and means for carrying out the purification of solutions of electrolytes by ion transfer while eliminating gas-liberation at the anode thereby rendering the selection of an anode economically feasible. Another object is to effect an economy of operation by lowering the voltage drop across the cell by an amount equal to the voltage required to evolve gas at one or both electrodes.

The broad object of my invention is attained by ways and means revolving about the basic concept that polarization at the electrodes can be eliminated, or at least kept below the point of gas evolution, if a sufficient supply of active ions is maintained at the electrodes (i. e. in the immediate vicinity of the electrode surface or boundary.) By active ions, I mean those variable valence ions that will reduce or oxidize at the electrodes yet still remain in solution in either form. In short, polarization is brought about by the addition or loss of electrons and I prevent polarization by providing active-ions that can take up or give up electrons yet remain in solution.

The specific objects are attained in a multi-chambered direct-current supplied electrolytic membrane cell by a critical arrangement of the permselective membranes in combination with the continuous supply of a redox solution to both the anode and cathode chambers.

The invention makes use of the basic principle that a redox solution in a direct-current supplied electrolytic cell will absorb electrons during reduction and give them up during oxidation so that, if the solution is of the proper reduction-oxidation potential, there will be no gas evolution at the electrodes.

Thus, with a 1 to 1 $FeCl_3$–$FeCl_2$ redox solution, when the supply of active ions ($Fe^{+++}$) at the cathode decreases below the initial concentration due to the reaction, $$Fe^{+++} + e \rightarrow Fe^{++}$$

then the potential of the electrode increases according to the change in the ratio of $Fe^{+++}$ to $Fe^{++}$ at its surface. This change in potential may be expressed as $$(\text{Potential change}) \ \Delta E = 0.06 \log \frac{Fe_{(2)}^{++}}{Fe_{(2)}^{+++}} \times \frac{Fe_{(1)}^{+++}}{Fe_{(1)}^{++}}$$

where $Fe_{(1)}$ is concentration at start and $Fe_{(2)}$ is final concentration. As the potential rises, ferric ions ($Fe^{+++}$) are attracted more strongly to the cathode, but if the supply of ferric ions is insufficient then the current flow becomes great enough to reach the discharge potential of hydrogen ion ($H^+$) and hydrogen gas is formed. There are then two reactions namely, (1) $Fe^{+++} + e \rightarrow Fe^{++}$ and (2) $2H^+ + 2e \rightarrow H_2$ occurring simultaneously at the cathode. Thus, the problem is to maintain an available concentration of $Fe^{+++}$ so that the reduction of $Fe^{+++}$ is carried out at such a rate that the cathode potential does not reach the discharge potential of hydrogen.

Except for the reactions involved, the same problem exists at the anode and it is solved in the same general manner.

By combining the foregoing principle with a critical arrangement of permselective membranes in a cell, this invention attains the objects of continuously removing ionic material from solutions without gas evolution at the electrodes to the end that inexpensive electrode material is useable while at the same time hydroxide precipitation is eliminated and power consumption of the cell is reduced.

The basic concept of this invention may be embodied in a direct current supplied electrolytic cell which is divided into two chambers by a permselective membrane disposed between the electrodes, and continuously recirculating through the chambers thus formed a compatible redox solution having a variable valence ion that is of opposite sign to ions passing through the permselective membrane, said solution also having a redox potential such that gas evolution at least at the anode is excluded.

Thus, if the permselective membrane dividing the cell is an anion membrane, then the redox solution should be one having a variable valence cation that is compatible in all valences with its own anion, which in this case is the ion passing through the membrane. A typical redox solution is a solution of ferrous and ferric chloride. In the cathode chamber ferric iron gains an electron and is reduced to ferrous iron while the chloride ion passes through the membrane into the anode chamber. In the anode chamber ferrous iron gives up an electron and is oxidized to ferric iron which is compatible with incoming chloride ions. The net result is the continuous passage of direct current through the cell without gas evolution at the electrodes.

If the permselective membrane is a cation membrane then the redox solution must have a variable valence anion, however, the mechanics of operation are similar.

This invention utilizes the above described basic ideas in a direct-current supplied electrolytic membrane cell to continuously purifying solutions by the removal of ionic materials. Thus, the invention contemplates an electrolytic cell divided into a plurality of adjoining chambers including a cathode chamber and an anode chamber with at least two intermediate chambers therebetween, the intermediate chambers being formed by cation membranes and anion membranes alternatingy disposed between the electrodes with the membrane separating the cathode chamber from its adjoining chamber being the same type as that separating the anode chamber. Each chamber is filled with electrolyte, and thereafter electrolyte solution to be purified is supplied to one of the two intermediate chambers while a wash liquid is supplied to the other intermediate chamber, and a redox solution is continuously circulated between the anode and cathode chambers said solution having a multivalent ion that is of opposite sign to and compatible with ions transferring through the membranes nearest the electrodes said solution also having a redox potential and rate of circulation such that gas liberation at the electrodes is excluded.

Thus, in the process described, the redox solution must have a reduction-oxidation potential such that it will preferentially reduce at the cathode and oxidize at the anode to the exclusion of gas evolution. The supply of redox solution to the electrode chambers must be sufficient to maintain an adequate supply of reducible and/or oxidizable ions at the electrodes at all times so that the reduction-oxidation potential of the solution is maintained within limits which preclude gas evolution.

Elimination of hydrogen gas evolution at the cathode insures that there will be no hydroxyl ions available to form insoluble hydroxides. Elimination of chlorine and oxygen gas evolution at the anode makes possible the use of inexpensive anode material thus materially reducing capital cost and eliminating replacement expense. By elimination of gas evolution in the cell, the problems attendant upon proper handling of the gases are avoided and the danger of undesirable agitation of solutions is eliminated.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall with- In the drawings:

Figure 3 is a diagrammatic flow sheet showing a preferred flow arrangement for use in a commercial size electrolytic cell utilizing the invention.

Figure 1:
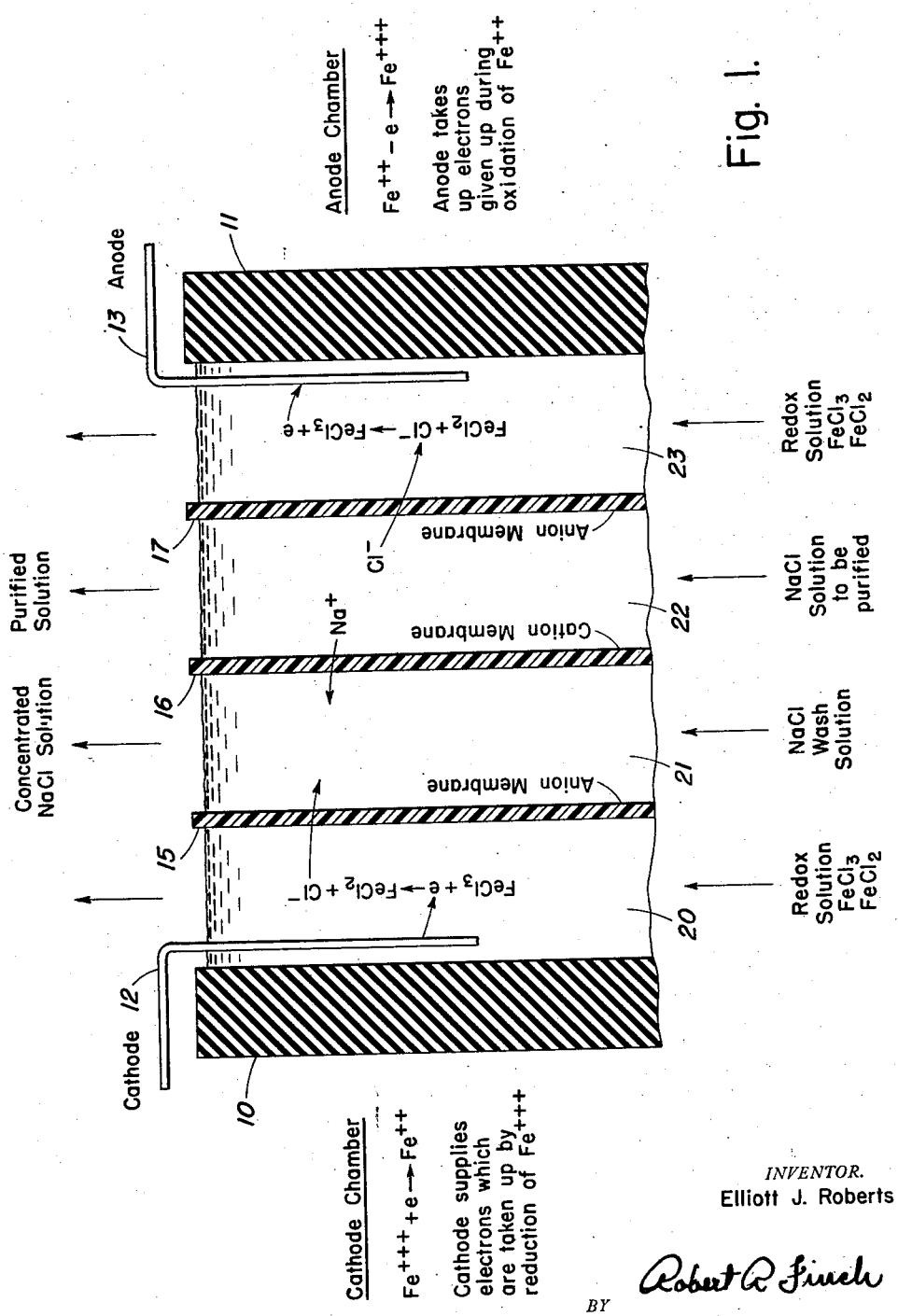
Figure 1 is a partial cross-sectional view of an electrolytic membrane cell embodying my invention under conditions utilizing a redox solution having a multi-valent cation.

In Figure 1, the electrolytic cell comprises a tank 10 having non-conducive or insulating walls 11 and equipped with a cathode 12 at one end and an anode 13 at the opposite end. The tank is divided into an even number of individual adjoining chambers by transversely disposed permselective membranes 15, 16 and 17. The chambers thus formed include a cathode chamber 20 at one end and an anode chamber 23 at the opposite end with a concentrating chamber 21 adjoining the cathode chamber and a purifying chamber 22 adjoining both the concentrating chamber 21 and the anode chamber 23.

Permselective membranes 15 and 17 located nearest the electrodes are anion membranes (pass anions but repel cations) while the center membrane 16 is a cation membrane (passes cations but repels anions). Thus, when direct current is applied across the cell, cations can neither enter nor leave chambers 20 and 23 except in the solution passing through the chamber itself, while anions are free to pass from the cathode chamber 20 into the adjacent concentrating chamber 21 and from purifying chamber 22 into the adjacent anode chamber 23. Of course, cations are free to pass from purifying chamber 22 through its cation membrane 16 into the adjacent concentrating chamber 21.

Figure 2:
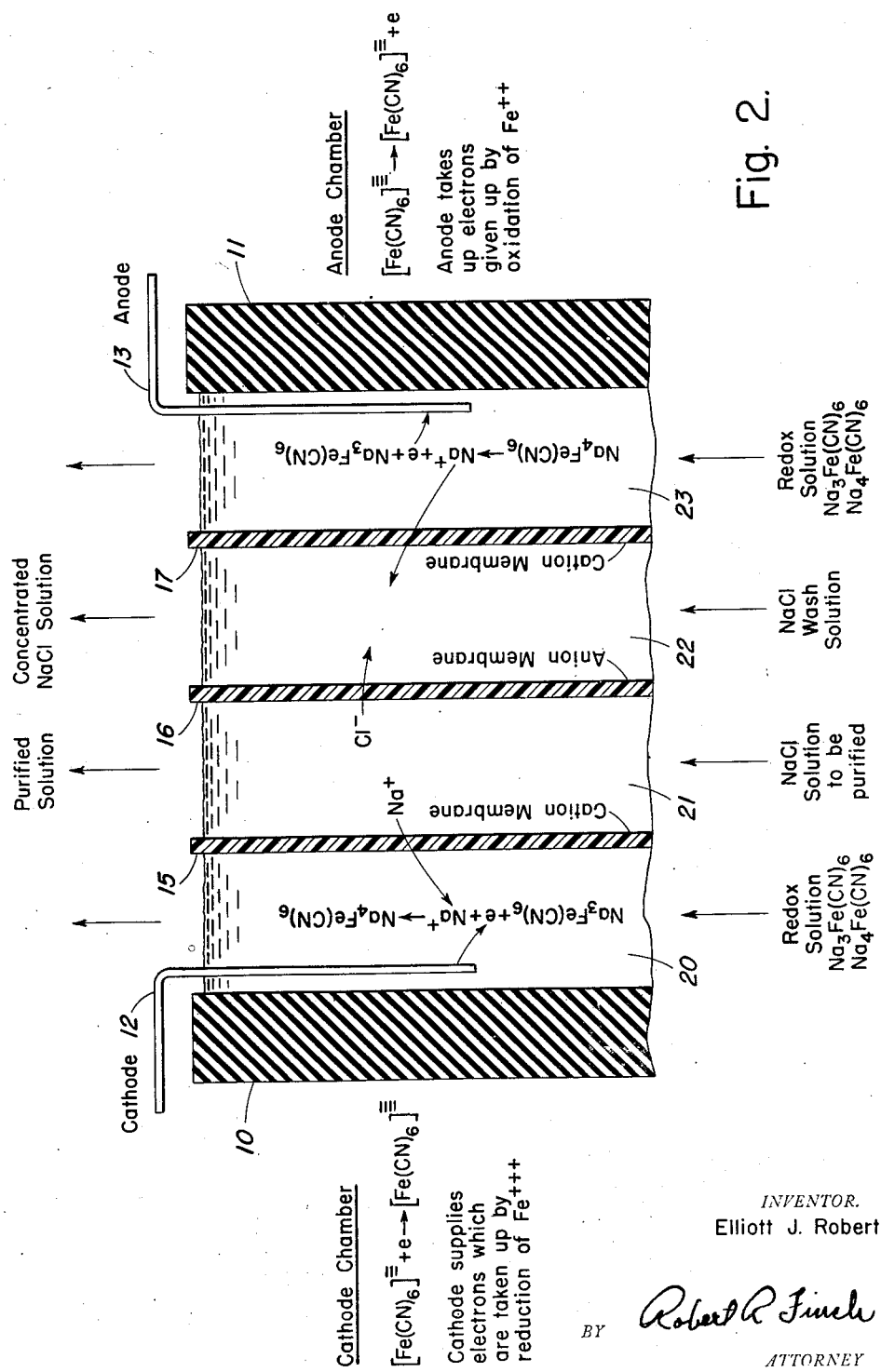
Figure 2 is a partial cross-sectional view of an electrolytic cell embodying the invention under conditions utilizing a redox solution having a multi-valent anion.

Figure 2 is a partial cross-sectional view of an electrolytic cell similar to that of Figure 1 except having a membrane arrangement such that it will utilize a redox solution having a multivalent anion.

In Figure 2 the electrolytic cell comprises a tank 10 having insulated walls 11 and equipped with a cathode 12 and an anode 13. This tank is divided into individual chambers by permselective membranes 15, 16 and 17. The chambers thus formed include a cathode chamber 20, an anode chamber 23, at opposite ends of the electrolytic cell and a purifying chamber 21 adjoining the cathode chamber with a concentrating chamber 22 located between and adjoining both the purifying chamber 21 and the anode chamber 23.

The permselective membranes 15 and 17 are cation membranes (pass cations but repel anions) while the center membrane 16 is an anion membrane (passes anions but repels cations). Thus when direct current is applied across the cell anions can neither enter nor leave chambers 20 and 23 except in the solution passing through the chamber, while cations are free to pass from the anode chamber 23 into the adjacent concentrating chamber 22 and from purifying chamber 21 into the adjacent cathode chamber 20. Of course, anions are free to pass from the purifying chamber 21 into the concentrating chamber 22 through the anion membrane 16.

Except for the type of ions transferred (i. e. cations or anions) and the arrangement of the membranes, the operation of the modification shown in Figure 1 is substantially the same as the operation of that shown in Figure 2, so description of the operation of Figure 1 will serve to describe the operation of Figure 2.

Referring now to Figure 1, the intermediate cells 21 and 22 are filled with an electrolyte such as sea water while there is constantly recirculated through the cathode chamber and the anode chamber a redox solution such as a mixture of $FeCl_3$ and $FeCl_2$. A direct current is impressed across the electrolytic cell between the electrodes. In this case the operation is as follows:

For every faraday of electricity passing through the cell,

1. One equivalent of $Cl^-$ is transferred from the cathode chamber 20 to its adjoining concentrating chamber 21.
2. One equivalent of $Fe^{+++}$ in the cathode chamber 20 is reduced to $Fe^{++}$, the electron, $e$, being supplied by the cathode.
3. One equivalent each of $Na^+$ and $Cl^-$ is transferred out of the purifying chamber 22 into its adjoining concentrating chamber 21 and its oppositely adjoining anode chamber 23 respectively.
4. One equivalent of $Fe^{++}$ is oxidized to $Fe^{+++}$ in the anode chamber 23, the electron, $e$, discharging at the anode.

Referring again to Figure 1, the operation is made continuous by continuous supply of solution to be purified to the purifying chamber 22 and the continuous supply and discharge of wash material through the concentrating or wash chamber 21. The redox solution, which in this case is a mixture of ferric chloride and ferrous chloride, is continuously passed through each of the electrode chambers. Thus, under conditions of continuous operation, continuous reduction is carried out in the cathode chamber 20 while continuous oxidization is carried out in the anode chamber 23 and purification of feed solution along with concentration of the wash solution occurs in chambers 22 and 21 respectively.

All electron transfer occuring at the electrodes is accounted for by oxidation and reduction of the redox solution in the anode and cathode chambers, therefore no gas evolution occurs at either electrode.

The avoidance of gas evolution provides several other important advantages in that it results in a considerably lower voltage requirement for my membrane cell by eliminating the voltage required for such gas evolution and, since in a membrane cell gas evolution accounts for almost the entire voltage demand, it follows that operating costs are considerably lessened. As a matter of fact, having eliminated gas evolution, the only voltage required to operate my membrane cell is that necessary to satisfy the concentration potential across the individual membranes and to overcome the resistance of the membranes and electrolyte solutions.

In prior membrane cells where gas is evolved it is necessary to provide the cell with a great number of intermediate chambers in order to offset the cost of gas evolution. In other words, where gas is evolved, the operating cost is so high that it can only be justified if it support a cell having a great number of chambers over which to spread the operating cost. As a result, a prior membrane cells are economically inflexible because their operating costs are fixed at an irreducible minimum by the voltage required to evolve gas.

My invention overcomes the foregoing drawback by drastically reducing or eliminating entirely the decomposition voltage required to evolve gas. Thus, my membrane cell is not burdened by the above mentioned irreducible minimum voltage requirement and is therefore possessed of great economic flexibility because its voltage requirement is measured only by the number of membranes and chambers it contains. This means that my membrane cell can be economically utilized as a small unit with relatively few chambers, the only additional cost factor to be considered being that of recirculating redox solution between the electrode chambers.

This reduction in voltage requirement can be readily appreciated if one remembers that the voltage for evolving gas ($H_2$, $O_2$ and $Cl_2$) is on the order of 2.2 volts whereas the total voltage drop across a typical membrane is on the order of only 0.1 v. or less and the average drop across a solution-filled chamber is also of the same order of magnitude.

Figure 3 shows preferred flow arrangement for use in a commercial membrane cell embodying this invention.

In Figure 3 the cell is made up of a tank 10 having insulating side walls 11 and equipped with a cathode 12 at one end and an anode 13 at the opposite end. The electrolytic cell thus formed is divided into an even number of adjoining chambers by permselective membranes 14 and 15 transversely disposed at equal divisions between the anode and cathode. In the embodiment shown, the membranes 14 nearest the electrodes are anion membranes while the alternating membranes between the anion membranes are cation membranes. There is thus defined between the cathode chamber and the anode chamber a plurality of intermediate chambers including equal members of concentrating chambers 21 and purification chambers 22. Thus, the chamber adjoining the cathode chamber is a concentrating or wash chamber while the chamber at the other end of the cell adjoining the anode chamber is a brine purification or ionic material removal chamber.

Solution to be purified is continuously supplied to the cell by means of valved conduit 27 and is then divided by means of valved conduits 28 into separate streams entering the purifying chambers of the cell. As the material passes through the cell, the ions are removed by ion transfer and the purified water is then discharged via conduits 29 into common discharge conduit 30. Conveniently, the solution supplied to the wash or concentrating chambers 21 comprises a portion of the purified material discharged from purifying chambers. This material may be by-passed via conduits 31 into the adjoining concentrating chambers 21 and in flowing through the concentrating chambers pick up the ionic material transferred into these chambers from adjoining purification chambers. Inasmuch as the volume required for washing in the concentrating chambers is only a fraction of the total volume of purified liquid, it follows that the material discharging from the concentrating chambers 21 via valved discharge conduits 32 and discharge conduit 33 is of considerably higher concentration than the initial incoming feed.

Oxidation is continuously carried out in the anode chamber and reduction is continuously carried out in the cathode chamber, to the exclusion of gas evolution in either chamber, by the continuous recirculation between those chambers of a redox solution containing such as a ferrous chloride and ferric chloride solution. This recirculation is accomplished by means of conduit 25 with break gap 26 which provides for the continuous recycling of the material through and between the electrode chambers while at the same time the break gap prevents a shorting of the electric current across the recirculation lines.

In operation, it is necessary that the reduction-oxidation potential of the redox solution be adjusted in correlation with its rate of recirculation so that the reduction and oxidation reactions are carried on to the exclusion of gas-evolving reactions.

The capacity of the cell in terms of quantity of solution purified depends upon the degree of purification required, the initial concentration of the solution, the total membrane area and the power efficiency desired. The transfer of ions selectively through the membranes is more efficient at higher concentrations than it is at lower concentrations because of the increased resistance at the lower concentration. Care should be taken, however, that the concentrations are not too high because at extremely high concentrations most permselective membranes tend to leak ions of the opposite sign and consequently interfere with proper purification operations. All of the foregoing factors are, to a degree, variable and these variations are easily taken into account by simple tests in each particul case. Membrane efficiencies and limitations under varying conditions have been determined by membrane manufacturers and data is readily available to users.

In any membrane cell, the type and structure of the membranes is of utmost importance as is also the spacing of the membranes. Generally speaking, the membranes may be easily selected for a given job from manufacturers' lists. Typical of such membranes are those described by Juda et al. in U. S. Patents 2,636,851 and 2,636,852.

Spacing of the membranes will also be dictated by the circumstances of the particular situation, however, as a general rule the individual chambers will be formed between membranes spaced less than one-half inch apart in order to minimize the effect of the resistance of solutions in the chamber and to insure efficient ion transfer. All of the foregoing factors are well understood in the art and need not be detailed here inasmuch as this invention is directed to ways and means for more efficient utilization of membranes rather than to the membranes themselves.

It is critical to proper operation of this invention that the redox solution be maintained at a reduction-oxidation potential sufficient to exclude gas evolution at the electrodes and that the rate of redox solution supply to the electrode chambers be sufficient to maintain the proper reduction-oxidation potential therein at all times. In other words, the solution strength and supply rate must be correlated to the electrode surface current density in order to attain and maintain continuous operation without gas evolution.

The foregoing factors are easily ascertained by simple experimentation with the particular redox solution to be used in the cell. Generally speaking, the optimum strength of the solution to be used will vary with the concentration of the ionic material bearing solution undergoing purification. However for sea water purificating the concentration of an $FeCl_3$–$FeCl_2$ redox solution should be in the range of 10–20 grams Fe per liter. The rate of supply or recirculation of the solution to the electrode chambers should be sufficient to keep the ferrous-ferric ratio near unity. Of course, in the cathode chamber the ferric concentration will diminish while in the anode chamber the ferrous concentration will diminish and the ferric will increase, however, if the recirculation rate is sufficiently high, the ratio of ferric to ferrous will be near unity for all practical purposes.

It may be necessary to periodically or continually adjust the pH of the iron solutions circulated to the electrode chambers to prevent hydrolysis and precipitation of iron compounds. The reason for such adjustment is that there may be some tendency for hydrogen ions to transfer through the anion membrane next to the anode chamber thereby causing a loss of acidity in the redox solution. This loss will have to be compensated for by the addition of acid if it becomes too severe. The actual required pH will vary somewhat with the nature of the anions in the redox solution at equilibrium which in time will vary with the nature of the solution undergoing purification.

It may also be necessary to adjust the ratio of ferrous-ferric ions in the circulating solution in order to maintain optimum conditions. This can be done in a variety of ways such as wasting part of the solution and/or adding more of the particular ion desired.

A modification of the invention useful under differing conditions is to circulate two or more strengths of redox solution into different elevations of the electrode chambers in order to provide more ions at the elevations of greatest electron transfer and lesser concentrations of ions at elevations where the intermediate compartments have lower concentrations. This would require the use of horizontal dividers in the electrode compartments in order to aid in confining the supplied streams.

Proper utilization of this invention enables use of a graphite anode. For uses other than the purification of sea water or brine, such as uses where the anions present are chiefly sulphates, a lead anode, preferably 8% antimony-lead, may be used with good results. In all cases the cathode may be of any suitable material having a long life.

Example I

The effect of active-ion concentration (i. e. solution strength and flow rate) is illustrated by simple laboratory tests.

Two sheet platinum electrodes, 5/16" x 1" were spaced ½" apart in an eight ounce glass bottle. The bottle was filled with a solution of .05M $FeCl_3$ and .05M $FeCl_2$. Direct current was supplied to give a total current of 14 milliamperes.

Under the foregoing conditions, the voltage across the electrodes rose to 1.62 volts with gas being evolved at the cathode.

Momentary interruption of the current showed a polarization back E. M. F. of 1.42 volts. This difference of 0.20 volt from the initial voltage was the IR drop across the solution. In other words, the solution presented an effective resistance of about 14½ ohms.

The current (14 milliamperes) was reestablished and at the same time the solution was carefully swirled in order to produce continuous solution flow past each electrode at a velocity of 0.5–1.0 foot per second. This solution flow reduces the thickness of the boundary layer on the electrode surface and increases the availability of active ions at the electrode.

Under the foregoing conditions, with constant flow of solution past the electrodes, gas evolution ceased entirely and the voltage across the electrodes dropped to 0.25 volt while current rose to 17 milliamperes. The effective resistance was again 14½. Thus, it is apparent that flow of the solution past the electrodes at a velocity of 0.5 to 1.0 foot/second successfully eliminated all polarization at a total anode or cathode current density of 4.0 amperes per square foot. Other tests demonstrated that these results are equivalent to an anode or cathode front face current density of 6 amperes per square foot.

At the same solution strength (0.05 M $FeCl_3$ and 0.05 M $FeCl_2$), increasing the front face current density to 12 amperes per square foot (34 milliamperes) resulted in a minimum polarization of 0.3 volt which could not be further reduced even by the most vigorous swirling of the solution. At a polarization of 0.3 volt, gas evolution was eliminated, but the still existing polarization resulted in unnecessary potential drop. At low solution recirculation velocities (0.5 to 1 F. P. S.) higher concentrations of $FeCl_3$ and $FeCl_2$ (0.25 M each) permitted operation at front face current densities up to 30 amperes per square foot without polarization or gas evolution. This demonstrates that, in order to maintain sufficient active-ion concentration at the electrodes for substantial elimination of polarization with a practical velocity of solution flow, the active-ion concentration of the solution as well as the solution flow rate must be correlated with the electrode surface current density.

With dissimilar electrodes, such as a stainless steel cathode and a carbon anode, the results are comparable, but are complicated by the intrinsic difference in potential between the electrodes and by the fact that the potential will not stabilize upon interruption of the current. However, even with dissimilar electrodes gas evolution and polarization were eliminated.

Example II

The following illustrates a contemplated mode of operation of a preferred embodiment of the invention.

To continuously produce 1000 gallons per hour of water containing 500 p. p. m. NaCl from a brine initially containing 4000 p. p. m. NaCl a unit containing 202 separate comparts will be used.

The basic tank is divided by alternating 8' x 8' permselective membranes into 202 separate compartments 8' x 8' x 4 mm. One end of the tank is provided with an 8' square stainless steel cathode while the other end is provided with an 8' square carbon anode.

In the drawings, Figures 1 and 3 illustrate the equipment. A tank 10 is provided with a stainless steel cathode 12 at one end and a carbon anode 13 at the other end. This tank is subdivided into 202 individual compartments by alternating 101 anion membranes with 100 cation membranes so that anion-permable membranes are closest to each electrode thus forming a cathode chamber 20 and an anode chamber 23 with 200 adjoining compartments 21 and 22 therebetween.

A redox solution of 0.05 M $FeCl_3$ and 0.05 M $FeCl_2$ is continuously circulated between the anode and cathode compartments at a rate of 6 gallons per minute.

The unit will have 200 compartments in which to effect the desalting of the solution at the desired rate. One half (100) of these compartments are for purifying or desalting while the other 100 are for concentration and removal of NaCl.

Feed solution containing 4000 p. p. m. NaCl is supplied to each purifying compartment 22 at the rate of 1.5 gal./hr. or a total feed of 1500 gal./hr. Desalted solution is split, with two thirds going to produce and the remainder being recycled to furnish a wash solution in the concentration cells 21. Thus the unit will produce 1000 gal./hr. product and 500 gal./hr. of concentrated NaCl solution.

In operation, the .05 M $FeCl_3$–.05 M $FeCl_2$ is circulated between the electrode compartments at a rate of 360 gal./hr. and a potential of 40 volts is applied across the electrode. This resulted in a current of 91 amperes.

Expressed in liters, flow through each purifying chamber is 56.9 liters/hr. At a current of 91 amperes, 3.4 gram equivalents/hr. of NaCl are removed from the solutions of each purifying compartment and transferred into adjacent concentrating compartments for removal in the wash solution.

Removal of 3.4 gram equivalents of NaCl from 56.9 liters of 4000 p. p. m. NaCl solution yields a product having 500 p. p. m. NaCl.

At 6 gal./min., 1365 liters/hr. of $FeCl_3$–$FeCl_2$ solution circulated through the electrode compartments. The net concentration change for each pass through an electrode compartment is 0.0025 equivalent. That is, in passing through the cathode compartment, the $FeCl_3$ solution concentration drops from 0.05 to 0.0475 mole/liter while the $FeCl_2$ increases to 0.0525 mole/liter. In the anode compartment, the concentration of both $FeCl_2$ and $FeCl_3$ are readjusted to 0.05 moles/liter.

Special care must be taken to distribute the redox solution evenly over the bottom of the electrodes to give a velocity of 8 foot/min. over the electrode surfaces. No gas is evolved and substantially complete depolarization is attained.

I claim:

1. The process of treating an electrolyte working solution by way of ion transfer through a series of cation and anion permselective membranes arranged in alternation in an electrolytic cell and sub-dividing said cell into a series of chambers comprising at one end a cathode chamber and at the other end an anode chamber, and between said electrode chambers at least a pair of working chambers for conducting said ion transfer treatment by passing the electrolyte working solution through one working chamber for yielding ions therefrom through the bounding membranes and by passing a carrier working solution through the other working chamber for receiving ions through the bounding membranes while also continuously passing an auxiliary electrolyte solution through each electrode chamber; characterized thereby that said auxiliary electrolyte solutions comprise a solution having an active ion in a reversible oxidation-reduction system operable in such a range of concentration ratios of the oxidized to the reduced valence state, as is adapted to establish by reduction at the cathode an electrode potential more positive that that which is critical for gas evolution at the cathode, and also adapted to establish by oxidation at the anode an electrode potential more negative than that which is critical for gas evolution, and that such auxiliary electrolyte solution is passed continuously in circuit through both said electrode chambers at a rate and concentration high enough to operate within said range of concentration ratios at the surface of the electrode, the auxiliary electrolyte being selected to be compatible and non-precipitable with respect to the ions of said working solutions, migrating through the respective membranes into the respective electrode chambers, and said sequence of permselective membranes being arranged so that the electrode chambers are separated from the working chambers by membranes of the kind impermeable to said active ions.

2. The process of treating the electrolyte working solution according to claim 1, in which said active ion is a cation, and said series of ion-permeable membranes comprises a pair of anion-permeable membranes bounding the respective electrode chambers, with a cation-permeable membrane inteposed between said anion-permeable membranes, whereby the ion yielding working chamber adjoins the anode chamber and the ion receiving chamber adjoins the cathode chamber.

3. The process of treating the electrolyte working solution according to claim 1, in which said active ion is an anion, and said series of ion-permeable membranes comprises a pair of cation-permeable membranes bounding the respective electrode chambers, with an anion-permeable membrane interposed between said cation-permeable membranes, whereby the ion-yielding working chamber adjoins the cathode chamber and the ion receiving chamber adjoins the anode chamber.

4. The process of treating the electrolyte working solution according to claim 1, in which said series of ion-permeable membranes comprises a pair of anion-permeable membranes bounding the respective electrode chambers, with cation-permeable membrane interposed between said anion-permeable membranes whereby the ion-yielding working chamber joins the anode chamber and the ion receiving chamber adjoins the cathode chamber, and in which both working solutions are NaCl-bearing solutions, and in which said auxiliary electrolyte solutions comprises $FeCl_3$ and $FeCl_2$ containing $F^{+++}$ as the active ion reducible at the cathode according to $Fe^{+++} + e \rightarrow Fe^{++}$ and oxidizable at the anode according to $Fe^{++} - e \rightarrow Fe^{+++}$.

5. The process of treating the electrolyte working solution according to claim 1, in which said series of ion-permeable membranes comprises a pair of cation-permeable membranes bounding the respective electrode chambers, with an anion permeable membrane interposed between said cation-permeable membranes whereby the ion-yielding working chamber adjoins the cathode chamber and the ion receiving chamber adjoins the cathode chamber, and in which both working solutions are NaCl-bearing solutions, and in which said auxiliary electrolyte solution comprises $Na_3Fe(CN)_6$ and $Na_4Fe(CN)_6$ reducible at the cathode according to

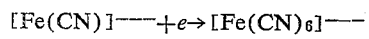

and oxidizable at the anode according to

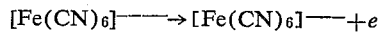

References Cited in the file of this patent

UNITED STATES PATENTS

| | | |
|---|---|---|
| 2,689,826 | Kollsman | Sept. 21, 1954 |
| 2,694,680 | Katz et al. | Nov. 16, 1954 |

FOREIGN PATENTS

| | | |
|---|---|---|
| 504,756 | Belgium | Aug. 14, 1951 |

OTHER REFERENCES

"Helvetica Chimica Acta," vol. 23 (1940), pages 795–800, article by Meyer et al.

"Electrochemistry," by Creighton et al., vol. I, 4th edition (1943), pages 170, 171 and 234.